(12) United States Patent
Orihara et al.

(10) Patent No.: US 9,940,319 B2
(45) Date of Patent: Apr. 10, 2018

(54) INFORMATION ANALYSIS SYSTEM, INFORMATION ANALYSIS METHOD, AND INFORMATION ANALYSIS PROGRAM

(71) Applicant: NIPPON TELEGRAPH AND TELEPHONE CORPORATION, Chiyoda-ku (JP)

(72) Inventors: Shingo Orihara, Musashino (JP); Atsutoshi Kumagai, Musashino (JP); Tetsuya Abe, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/313,749

(22) PCT Filed: May 25, 2015

(86) PCT No.: PCT/JP2015/064939
§ 371 (c)(1),
(2) Date: Nov. 23, 2016

(87) PCT Pub. No.: WO2015/182559
PCT Pub. Date: Dec. 3, 2015

(65) Prior Publication Data
US 2017/0185578 A1     Jun. 29, 2017

(30) Foreign Application Priority Data
May 29, 2014   (JP) ................................ 2014-111596

(51) Int. Cl.
*G06F 17/27*   (2006.01)
*G06N 99/00*   (2010.01)
*G06F 17/21*   (2006.01)

(52) U.S. Cl.
CPC .............. *G06F 17/27* (2013.01); *G06F 17/21* (2013.01); *G06N 99/005* (2013.01)

(58) Field of Classification Search
CPC .................................................. G06F 17/2745
(Continued)

(56) References Cited

U.S. PATENT DOCUMENTS

| | | |
|---|---|---|
| 8,645,395 B2 | 2/2014 | Mushtaq et al. |
| 2003/0101166 A1 | 5/2003 | Uchino et al. |

(Continued)

FOREIGN PATENT DOCUMENTS

| | | |
|---|---|---|
| EP | 1 450 268 A1 | 8/2004 |
| JP | 2007-58755 A | 3/2007 |

(Continued)

OTHER PUBLICATIONS

Decision of Patent Grant dated May 30, 2017 in Japanese Patent Application No. 2016-523487 (with unedited computer generated English translation).

(Continued)

*Primary Examiner* — Huyen Vo
(74) *Attorney, Agent, or Firm* — Oblon, McClelland, Maier & Neustadt, L.L.P.

(57) ABSTRACT

An information analysis system includes a remark analysis unit, a thread analysis unit, and a storing unit. The remark analysis unit analyzes importance of a remark included in a thread serving as a group of remarks posted on a network, based on remark data serving as data relating to the remark, for each of the remarks. The thread analysis unit analyzes which of a plurality of preset categories the thread belongs to, based on thread data serving as data relating to the thread. The storing unit stores the remark, the importance of the
(Continued)

remark, and a category of the thread including the remark in association with each other for each of the remarks, in a predetermined storage unit.

4 Claims, 8 Drawing Sheets

(58) Field of Classification Search
USPC .............. 704/1–10, 250, 251, 255, 257, 270
See application file for complete search history.

(56) References Cited

U.S. PATENT DOCUMENTS

| | | |
|---|---|---|
| 2003/0120649 A1 | 6/2003 | Uchino et al. |
| 2007/0061425 A1 | 3/2007 | Yamamoto et al. |
| 2007/0067288 A1 | 3/2007 | Chung |
| 2007/0124432 A1* | 5/2007 | Holtzman ........... G06F 17/2745 |
| | | 709/219 |
| 2007/0282940 A1 | 12/2007 | Sakurai |
| 2008/0109419 A1 | 5/2008 | Murakami et al. |
| 2012/0095952 A1 | 4/2012 | Archambeau et al. |

FOREIGN PATENT DOCUMENTS

| | | |
|---|---|---|
| JP | 2007-323412 A | 12/2007 |
| JP | 2007-328610 A | 12/2007 |
| JP | 2008-176721 A | 7/2008 |
| JP | 2010-231471 A | 10/2010 |
| WO | 03/046764 A1 | 6/2003 |
| WO | WO 2012/171073 A1 | 12/2012 |
| WO | WO 2014/047727 A1 | 4/2014 |

OTHER PUBLICATIONS

International Search Report dated Aug. 25, 2015 in PCT/JP2015/064939 filed May 25, 2015.
Extended European Search Report dated Aug. 2, 2017 in Patent Application No. 15799967.3.

* cited by examiner

INFORMATION ANALYSIS SYSTEM, INFORMATION ANALYSIS METHOD, AND INFORMATION ANALYSIS PROGRAM

FIELD

Embodiments of the present invention relate to an information analysis system, an information analysis method, and an information analysis program.

BACKGROUND

In recent years, an enormous amount of information (electronic data) is stored on the network, with increase in speed and reduction in cost of information processing techniques and spread of network techniques such as the Internet technique. For example, on a bulletin board (a bulletin board system) on the Internet, remarks posted by the users are collected in the chronological order.

An information recommendation technique to recommend various types of information has been proposed to enable the user to obtain desired information. Examples of the technique include a technique of generating a feature vector from a bulletin board to analyze the feature. In the technique, for example, when the user inputs a keyword, a bulletin board having a feature corresponding to the input keyword is presented to the user.

CITATION LIST

Patent Literature

Patent Literature 1: Japanese Patent Application Laid-open No. 2010-231471

SUMMARY

Technical Problem

However, conventional art has the problem that analyzing useful remarks from information posted on the network is difficult. For example, in the technique of generating a feature vector from a bulletin board to analyze the feature, useful remarks are buried under meaningless remarks, when the bulletin board includes many meaningless remarks.

An object of the present invention is to analyze useful remarks from information posted on the network.

Solution to Problem

An information analysis system includes: a remark analysis unit analyzing importance of a remark included in a thread serving as a group of remarks posted on a network, based on remark data serving as data relating to the remark, for each of the remarks; a thread analysis unit analyzing which of a plurality of preset categories the thread belongs to, based on thread data serving as data relating to the thread; and a storing unit storing the remark, the importance of the remark, and a category of the thread including the remark in association with each other for each of the remarks, in a predetermined storage unit.

Advantageous Effects of Invention

An aspect of the technique disclosed in the present application produces an effect of enabling analysis of useful remarks from information posted on the network.

DESCRIPTION OF EMBODIMENTS

Embodiments of an information analysis system, an information analysis method, and an information analysis program according to the present invention will be explained in detail hereinafter with reference to attached drawings. The present invention is not limited by the following embodiments.

First Embodiment

The following embodiment illustrates a configuration of an information analysis system according to the first embodiment and a flow of a process in the information analysis system in order, and illustrates effects of the first embodiment lastly.

Configuration of Information Analysis System

Figure 1:
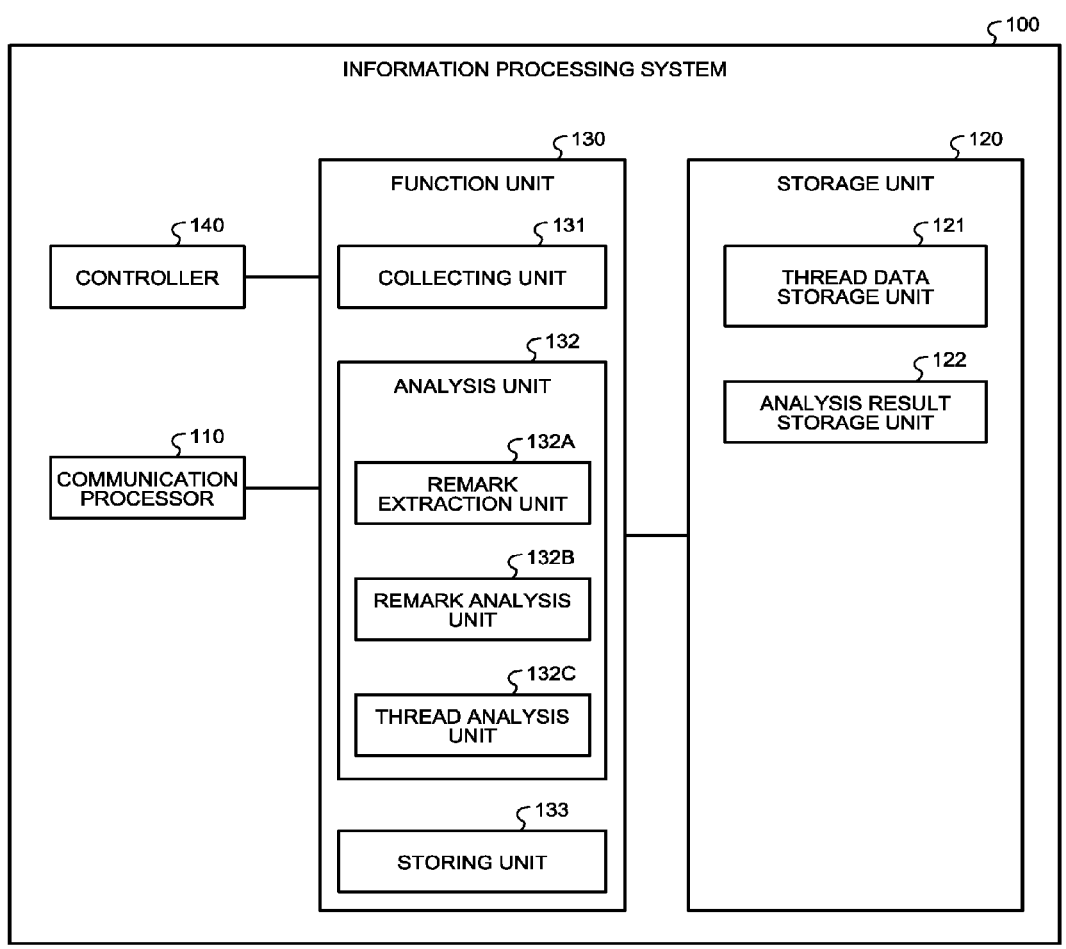
FIG. 1 is a diagram illustrating an example of a configuration of an information analysis system according to a first embodiment.

FIG. 1 is a diagram illustrating an example of a configuration of an information analysis system 100 according to the first embodiment. As illustrated in FIG. 1, the information analysis system 100 includes a communication processor 110, a storage unit 120, a function unit 130, and a controller 140. The information analysis system 100 is connected to the Internet.

The communication processor 110 controls communications relating to various types of information exchanged with a device on the network. For example, the communication processor 110 accesses bulletin board system (BBS) sites of various types on the Internet under the control of a collecting unit 131 described later.

As illustrated in FIG. 1, the storage unit 120 includes a thread data storage unit 121 and an analysis result storage unit 122. The storage unit 120 is a semiconductor memory device such as a random access memory (RAM) and a flash memory, or a storage device such as a hard disk and an optical disk.

The thread data storage unit 121 stores pieces of thread data collected from BBS sites on the Internet. The thread data is data relating to a thread serving as a group of remarks posted on the network. For example, the thread data storage unit 121 stores pieces of thread data collected by the collecting unit 131. For example, the thread data storage unit 121 is referred to by an analysis unit 132.

Figure 2:
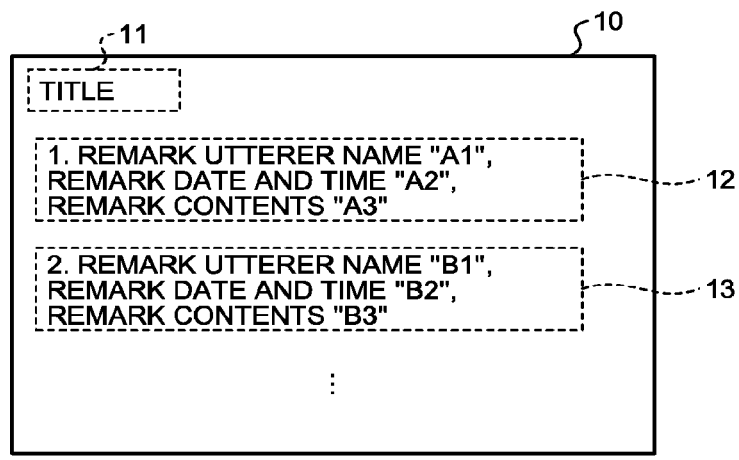
FIG. 2 is a diagram illustrating an example of thread data stored in a thread data storage unit according to the first embodiment.

FIG. 2 is a diagram illustrating an example of thread data stored in the thread data storage unit 121 according to the first embodiment. As illustrated in FIG. 2, for example, each piece of thread data 10 stored in the thread data storage unit 121 includes a title 11, a remark 12, and a remark 13. The title 11 is a title of the thread. The remarks 12 and 13 are remarks posted by the users of the BBS. Each of the remarks 12 and 13 includes the remark order, the remark utterer name, the remark date and time, and the remark contents. The example of FIG. 2 illustrates the case where the remark order of the remark 12 is "1", the remark utterer name is "A1", the remark date and time is "A2", and the remark contents is "A3".

The analysis result storage unit 122 stores analysis results. For example, the analysis result storage unit 122 stores analysis results analyzed by the analysis unit 132 described later. The analysis results stored in the analysis result storage unit 122 are stored by a storing unit 133 described later, for example. The analysis results stored in the analysis result storage unit 122 are output in accordance with a user's request.

FIG. 1 will be explained hereinafter again. The function unit 130 includes the collecting unit 131, the analysis unit 132, and the storing unit 133. The function unit 130 is a unit in charge of various processes, and actually achieved as (a component of) software or middleware. The controller 140 controls operations of the communication processor 110, the storage unit 120, and the function unit 130, to manage the operation of the information analysis system 100. Actually, the controller 140 is achieved by an integrated circuit such as a central processing unit (CPU) and a micro processing unit (MPU).

The collecting unit 131 collects pieces of thread data from information posted on the network. For example, the collecting unit 131 patrols BBS sites on the Internet, to collect pieces of thread data from the BBS sites. Thereafter, the collecting unit 131 stores the collected pieces of thread data in the thread data storage unit 121.

When the thread includes information other than character information, such as hypertext markup language (HTML) tags, scripts, and advertisements, the collecting unit 131 stores the thread in the thread data storage unit 121 after removing the information therefrom. The sites serving as patrol targets patrolled by the collecting unit 131 may be designated as a list of uniform resource locators (URL) or the like in advance, or may be designated each time the collection is performed.

The analysis unit 132 analyzes each piece of the thread data collected by the collecting unit 131. As illustrated in FIG. 1, the analysis unit 132 includes a remark extraction unit 132A, a remark analysis unit 132B, and a thread analysis unit 132C.

The remark extraction unit 132A extracts a remark included in the thread data, to generate remark data serving as data relating to the remark. The remark data is, for example, data in which the "remark order", "remark utterer name", "remark date and time", "remark contents", and "additional information" are associated. The "remark order", "remark utterer name", "remark date and time", and "remark contents" are pieces of data obtained by extracting corresponding portions from the thread data. The "additional information" is data associating the "number of characters", "reply flag", and "number of replies" with each other. The "number of characters" corresponds to the number of characters of the remark contents. The "reply flag" is a flag indicating whether the corresponding remark is a reply to another remark. For example, when the remark contents of the corresponding remark start with ">(numeral)", the remark is provided with a reply flag "1" indicating that the remark is a reply. By contrast, when the remark contents do not start with ">(numeral)", the remark is provided with a reply flag "0" indicating that the remark is not a reply. The expression "(numeral)" indicates the remark order of the remark serving as the reply target. The "number of replies" indicates the number of replies to the corresponding remark. For example, the number of remarks having the remark contents starting with ">(numeral)" corresponds to the number of replies to the remark of the numeral.

For example, the remark extraction unit 132A acquires a piece of thread data stored in the thread data storage unit 121. The remark extraction unit 132A extracts each of remarks included in the acquired thread data, and generates pieces of remark data for the respective remarks. The remark extraction unit 132A transmits the generated pieces of remark data to the remark analysis unit 132B. The remark extraction unit 132A also transmits the acquired thread data to the thread analysis unit 132C.

As an example, the following explanation illustrates the case where the remark extraction unit 132A acquires the thread data 10 illustrated in FIG. 2. The remark extraction unit 132A extracts the remark order "1", the remark utterer name "A1", the remark date and time "A2", and the remark contents "A3" of the remark 12 from the thread data 10. Thereafter, the remark extraction unit 132A counts the number of characters "A4" of the remark contents "A3". The remark extraction unit 132A generates a reply flag "A5 (A5 is 1 or 0)" in accordance with whether the remark contents "A3" start with ">(numeral)". The remark extraction unit 132A also counts the number "A6" of remarks starting with ">1", among the remarks included in the thread data 10. As a result, the remark extraction unit 132A generates data associating the remark order "1", the remark utterer name "A1", the remark date and time "A2", the remark contents "A3", the number of characters "A4", the reply flag "A5", and the number of replies "A6" with each other, as remark data of the remark 12. As described above, the remark extraction unit 132A generates a piece of remark data for each of all the remarks included in the thread data 10.

The remark analysis unit 132B analyzes the importance of each of the remarks included in the thread for each of the remarks, based on the remark data. For example, the remark analysis unit 132B uses a machine learning engine for calculating importance (score) of the remark from the remark data, to analyze the importance of the remark from the remark data generated by the remark extraction unit 132A. The remark analysis unit 132B transmits the importance of the remark to the storing unit 133, as an analysis result. In this case, the machine learning engine is caused to learn in advance feature vectors of important remarks and feature vectors of unimportant remarks. Examples of the learning method include a method of selecting some threads from representative BBS sites, manually classifying the remarks included in the threads into important remarks and unimportant remarks, and causing the machine learning engine to learn the remarks.

Specifically, the remark analysis unit 132B converts each piece of remark data into a feature vector, to put the remark data into the machine learning engine. In the operation, the remark analysis unit 132B converts numerical value data and character string data among the remark data individually, for example. For example, among the remark data, the remark analysis unit 132B uses numerical data such as the remark order, the remark date and time, the number of characters, the reply flag, and the number of replies, as values of the feature vector without any processing. The structure is not limited thereto, but the remark analysis unit 132B may perform any numerical value calculation processing on the numerical value data, to use the numerical value data as the values of the feature vector.

The remark analysis unit 132B also uses morpheme analysis, an n-gram, or delimiters to convert character string data, such as the remark utterer name and the remark contents, into a feature vector. For example, in the case of using morpheme analysis, the remark analysis unit 132B divides the character string data according to parts of speech, and converts the divided parts into a feature vector. For example, a library of an open source, such as Mecab, can be used for such morpheme analysis. For example, when the character string data is "I do not know how to use Twitter (registered trademark) very well, yet.", the remark analysis unit 132B uses morpheme analysis to divide the character string data into "I/do/not/know/how/to/use/Twitter/very/well/,/yet/."

In the case of using an n-gram, the remark analysis unit 132B generates groups, each of which includes n characters, from the head of the character string data while shifting the group by one character, and converts the groups into a feature vector. For example, when the character string data is "I do not know how to use Twitter very well, yet.", the remark analysis unit 132B uses the n-gram (n=3) to divide the character string data into "I d/ do/do /o n/ no/not/ot/ t k/ kn/kno/now/ow /w h/ ho/ . . . ".

In the case of using delimiters, the remark analysis unit 132B divides the character string data with delimiters (such as a space and a comma ",") determined separately, and converts the divided parts into a feature vector. For example, when the character string data is "I do not know how to use Twitter very well, yet." and the delimiter is the comma ",", the remark analysis unit 132B uses the delimiter to divide the character string data into "I do not know how to use Twitter very well/yet." Generally, morpheme analysis is used for Japanese sentences, and delimiter with a space is used for English sentences.

Thereafter, the remark analysis unit 132B converts the character string data divided into elements as described above into a feature vector. Examples of the method for converting the data into a feature vector include a method of using the number of times of appearance of each element as a feature vector without any processing, and a method of correlating whether the element appears with 1 or 0 regardless of the number of times. Any method may be used as long as the library of the machine learning engine to be used is compliant with the method.

The remark analysis unit 132B supplies the respective feature vectors converted from the respective pieces of remark data to the machine learning engine, to calculate importance of each of the remarks. The machine learning engine used herein may be of any type, such as Jubatus (registered trademark) of an open source. The remark analysis unit 132B provides each piece of the remark data with the importance of the remark calculated by the machine learning engine, and transmits the remark data together with the importance of the remark to the storing unit 133.

The processing of the remark analysis unit 132B described above is a mere example. For example, the remark analysis unit 132B may subject each piece of input remark data to preprocessing such as removal of unnecessary characters, unification of the character types, and replacement of words of a specific group, to improve the accuracy of analysis performed by the machine learning engine. Specifically, as removal of unnecessary characters, the remark analysis unit 132B removes excessive spaces and an URL serving as an obstacle to language processing from the character string data, for example. As another example, as unification of the character types, the remark analysis unit 132B unifies English capital letters and small letters, and halfwidth characters and fullwidth characters, for the characters used in the character string data. As another example, as replacement of words of a specific group, the remark analysis unit 132B replaces each of the words such as "Japanese feature phone", "smartphone", "smart phone", and "cellular phone" with the word "mobile phone". For example, as the character string data serving as a basis of the feature vector, only the remark contents may be used, or character string data obtained by coupling some elements, such as "the remark utterer name and the remark contents", may be used.

The thread analysis unit 132C analyzes which of a plurality of preset categories the thread belongs to, based on the thread data. For example, the thread analysis unit 132C uses a machine learning engine to analyze the category of the thread from the thread data, to analyze the category to which the thread belongs from the thread data received from the remark extraction unit 132A. Thereafter, the thread analysis unit 132C transmits the category to which the thread belongs to the storing unit 133, as an analysis result. In this case, the machine learning engine is caused to learn some threads and categories thereof in advance. Examples of a method for causing the engine to learn them include a method of selecting some threads from representative BBS sites, and manually inputting the categories to which the threads belong to the engine to cause the engine to learn them.

Specifically, the thread analysis unit 132C converts each piece of thread data into a feature vector, to put the thread data into the machine learning engine. The thread analysis unit 132C converts, for example, character string data included in the thread data, such as character string data obtained by coupling the title with the remark contents of each remark, into a feature vector using morpheme analysis, an n-gram, or delimiters. Explanation of the processing to convert the character string data into a feature vector using the morpheme analysis, an n-gram, or delimiters is omitted herein, because it is the same as the explanation described above.

Thereafter, the thread analysis unit 132C supplies the feature vector converted from the thread data to the machine learning engine, to determine the category to which the thread belongs. Any type of the machine learning engine can be used herein. For example, the machine learning engine may be Jubatus of an open source. Thereafter, the thread analysis unit 132C transmits the category of the thread determined by the machine learning engine to the storing unit 133.

The processing of the thread analysis unit 132C described above is a mere example. For example, the thread analysis unit 132C may subject each piece of the input remark data to preprocessing such as removal of unnecessary characters, unification of the character types, and replacement of words of a specific group, to improve the accuracy of analysis performed by the machine learning engine. In addition, for example, the thread analysis unit 132C may use another element, such as the remark utterer, in combination as well as the title and the remark contents of each remark, as character string data serving as a basis of the feature vector. The thread analysis unit 132C may use numerical value data such as the number of remarks, to obtain a feature vector, as well as the character string data.

The storing unit 133 stores the remark, the importance of the remark, and the category of the thread including the remark in association with each other, for each remark, in the analysis result storage unit 122. For example, the storing unit 133 receives the remark data and the importance thereof for each of the remarks from the remark analysis unit 132B. The storing unit 133 also receives the category to which the thread belongs from the thread analysis unit 132C. The storing unit 133 provides the category of the thread received from the thread analysis unit 132C as the category of the remark to a pair of the remark data and the importance thereof received from the remark analysis unit 132B, and stores them in the analysis result storage unit 122.

The pieces of information stored by the storing unit 133 in the analysis result storage unit 122 are, for example, retrieved with a key of "category", sorted in the order of scores of "importance", and presented to the user. Data with a specific score (importance) or more may be presented.

Process Performed by Information Analysis System

Figure 3:
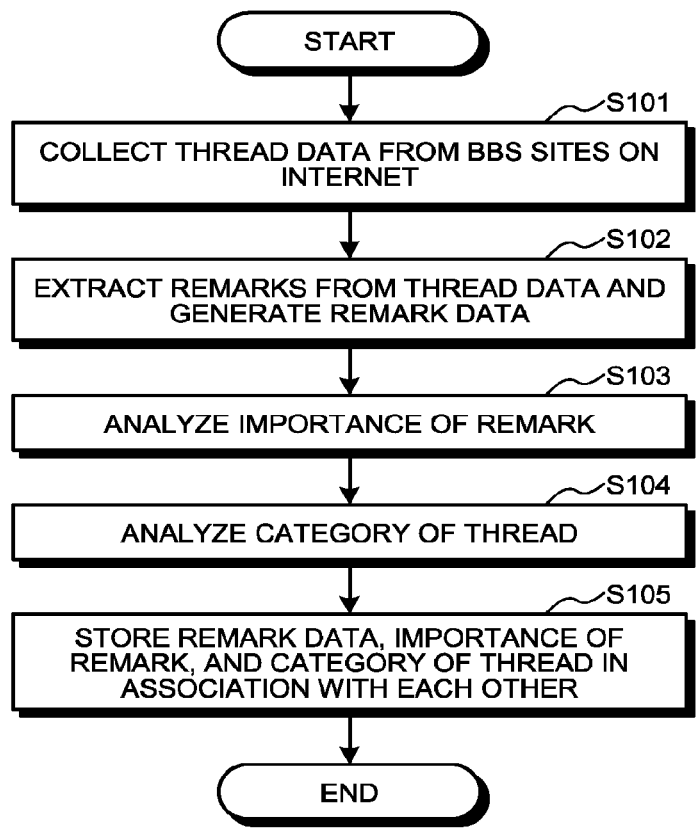
FIG. 3 is a flowchart illustrating a flow of a process in the information analysis system according to the first embodiment.

FIG. 3 is a flowchart illustrating a flow of a process in the information analysis system according to the first embodiment.

As illustrated in FIG. 3, the collecting unit 131 of the information analysis system 100 collects pieces of thread data from BBS sites on the Internet (Step S101). The collecting unit 131 stores the collected thread data in the thread data storage unit 121.

Thereafter, the remark extraction unit 132A extracts remarks from thread data, and generates remark data (Step S102). For example, the remark extraction unit 132A acquires the thread data stored in the thread data storage unit 121, extracts each of the remarks included in the acquired thread data, and generates respective pieces of remark data.

Thereafter, the remark analysis unit 132B analyzes the importance of the remark included in the thread, for each of the remarks (Step S103). For example, the remark analysis unit 132B uses a machine learning engine to calculate the importance (score) of the remark from the remark data, to analyze the importance of the remark from the remark data generated by the remark extraction unit 132A.

The thread analysis unit 132C analyzes the category of the thread (Step S104). For example, the thread analysis unit 132C uses a machine learning engine to analyze the category of the thread data from the thread data, to analyze the category to which the thread belongs from the thread data received from the remark extraction unit 132A.

The storing unit 133 stores the remark data, the importance of the remark, and the category of the thread in association with each other for each of the remarks, in the analysis result storage unit 122 (Step S105).

The processing procedure described above is not necessarily executed in the order described above. For example, the processing at Step S103 and the processing at Step S104 may be executed in the order reverse to the order described above, or may be executed as parallel processing. In addition, for example, when collected pieces of thread data exist, the processing at Step S101 may be omitted.

Effects of First Embodiment

As described above, the information analysis system 100 according to the first embodiment analyzes the importance of each of remarks included in the thread serving as a group of remarks posted on the network, based on the remark data, for each of the remarks. The information analysis system 100 analyzes which of a plurality of preset categories the thread belongs to, based on the thread data. The information analysis system 100 stores the remark, the importance of the remark, and the category of the thread including the remark in association with each other for each of the remarks, in the predetermined storage unit. This structure enables the information analysis system 100 to analyze useful remarks from information posted on the network.

Figure 4:
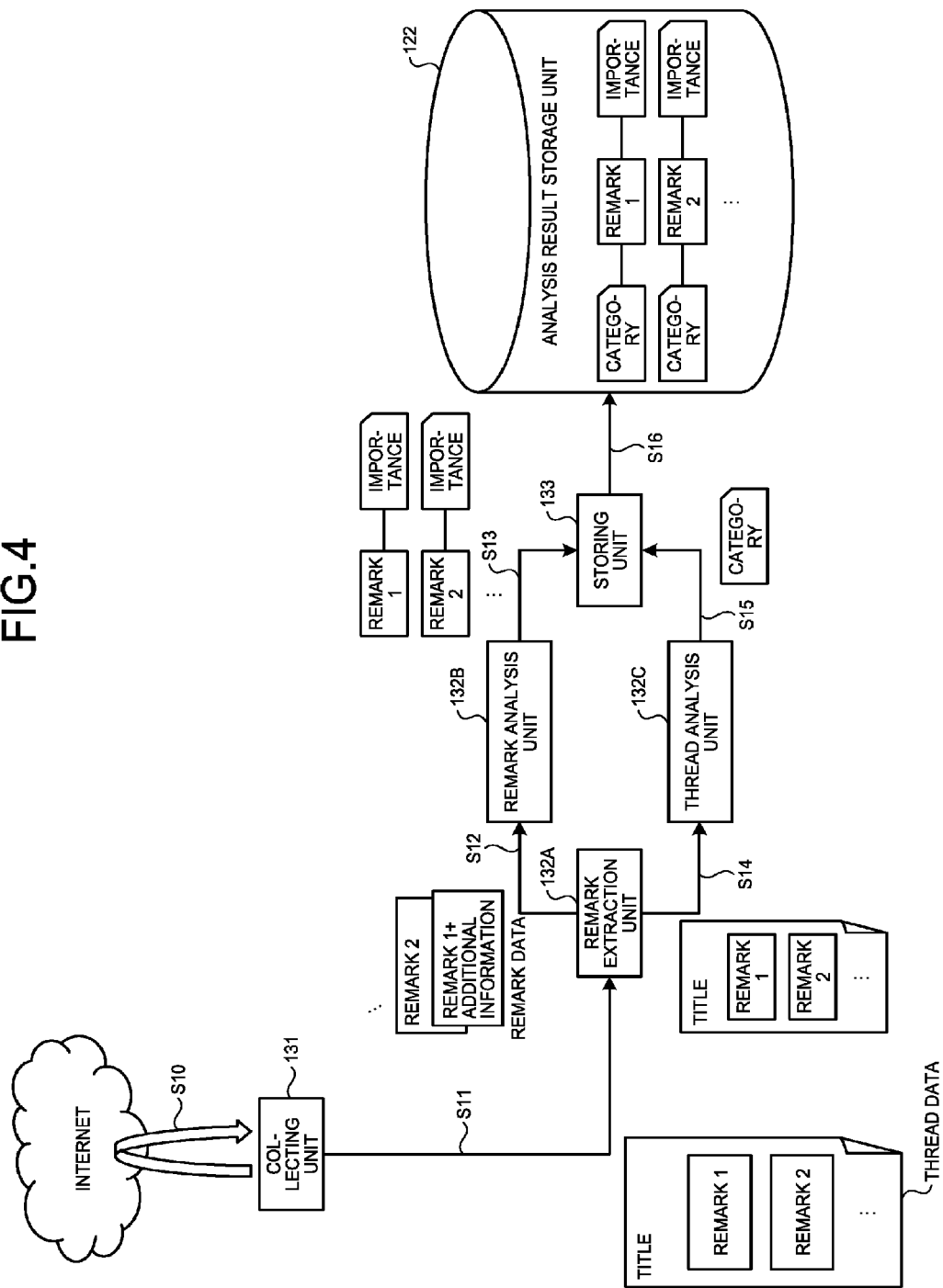
FIG. 4 is a diagram for explaining an effect of the first embodiment.

FIG. 4 is a diagram for explaining an effect of the first embodiment. As illustrated in FIG. 4, for example, in the information analysis system 100, the collecting unit 131 collects pieces of thread data from BBS sites on the Internet (S10), and transmits the collected pieces of thread data to the remark extraction unit 132A (S11). Thereafter, the remark extraction unit 132A extracts each of the remarks from the thread data to generate respective pieces of remark data, and transmits the generated remark data to the remark analysis unit 132B (S12). The remark analysis unit 132B analyzes the importance of the remark for each of the remarks, and transmits each pair of the remark data and the importance thereof to the storing unit 133 (S13). Thereafter, the remark extraction unit 132A transmits the thread data to the thread analysis unit 132C (S14). The thread analysis unit 132C analyzes the category of the thread, and transmits the analyzed category to the storing unit 133 (S15). The storing unit 133 stores the remark data, the importance thereof, and the category in association with each other for each of the remarks, in the analysis result storage unit 122 (S16). As described above, the information analysis system 100 stores the remark data, the importance thereof, and the category in association with each other for each of the remarks included in the collected thread data. With the structure, the information analysis system 100 is capable of storing the analysis results in a state in which useful remarks can be retrieved without being buried under meaningless remarks, even when the thread includes many meaningless remarks. In addition, because the information analysis system 100 analyzes the category for each of the threads to increase the information amount to be analyzed in comparison with the case of performing analysis for each of remarks, the information analysis system 100 is capable of analyzing the category to which the remark belongs with accuracy. As a result, in the information recommendation technique, the user is enabled to acquire only really useful remarks with meaningless remarks removed, in comparison with the case where remarks are extracted and recommended for each of the threads.

Second Embodiment

The first embodiment illustrates the case where the information analysis system 100 analyzes the importance for each of the remarks, but the embodiments are not limited thereto. For example, the information analysis system 100 may also analyze the importance of the thread, to unite the importance of the remark with the importance of the thread. For this reason, the second embodiment illustrates the case where the information analysis system 100 also analyzes the importance of the thread, and unites the importance of the remark with the importance of the thread. In the following explanation, explanation of the configuration and the process that are the same as those in the first embodiment will be omitted.

The following is explanation of a configuration of the information analysis system 100 according to the second embodiment, with reference to FIG. 1. The information analysis system 100 according to the second embodiment has a configuration similar to that of the information analysis system 100 illustrated in FIG. 1, but partly different therefrom in the processing in the thread analysis unit 132C and the storing unit 133.

The thread analysis unit 132C analyzes the importance of the thread, based on the thread data, in addition to the processing explained in the first embodiment. For example, the thread analysis unit 132C uses a machine learning engine to calculate the importance of the thread from the thread data, to analyze the importance of the thread. Thereafter, the thread analysis unit 132C transmits the importance of the thread, in addition to the category to which the thread belongs, to the storing unit 133 as an analysis result. In this case, the machine learning engine is caused to learn in advance feature vectors of important threads and feature vectors of unimportant threads. Examples of a method for causing the engine to learn the feature vectors include a method of selecting some threads from representative BBS sites, manually classifying important threads and unimportant threads, and causing the machine learning engine to learn them.

Specifically, the thread analysis unit 132C converts the thread data into a feature vector, to put the thread data into the machine learning engine. The thread analysis unit 132C converts, for example, character string data included in the thread data, such as character string data obtained by coupling the title with the remark contents of each remark, into a feature vector using morpheme analysis, an n-gram, or delimiters. Explanation of the processing to convert the character string data into a feature vector using morpheme analysis, an n-gram, or delimiters is omitted herein, because it is the same as the explanation described above.

The thread analysis unit 132C supplies the feature vector converted from the thread data to the machine learning engine, to calculate the importance of the thread. The machine learning engine used herein may be of any type, such as Jubatus of an open source. Thereafter, the thread analysis unit 132C transmits the importance of the thread calculated by the machine learning engine to the storing unit 133.

The processing of the thread analysis unit 132C described above is a mere example. For example, the thread analysis unit 132C may use numerical value data such as the number of remarks in the thread, to obtain a feature vector, as well as the character string data.

The storing unit 133 calculates total importance of the remark, based on the importance of the remark and the importance of the thread. The storing unit 133 stores the calculated total importance, the remark, and the category of the thread including the remark in association with each other for each of the remarks.

For example, the storing unit 133 receives the remark data and the importance of the remark from the remark analysis unit 132B, for each of the remarks. The storing unit 133 also receives the category to which the thread belongs and the importance of the thread from the thread analysis unit 132C. Thereafter, the storing unit 133 calculates total importance for each of the remarks, based on the importance of the remark received from the remark analysis unit 132B and the importance of the thread received from the thread analysis unit 132C. The method for calculating the total importance may be, for example, a method of calculating the sum of the importance of the remark and the importance of the thread, or a value obtained by an arithmetical operation such as the product and the mean. The storing unit 133 stores the remark data, the total importance, and the category in association with each other for each of the remarks, in the analysis result storage unit 122.

Figure 5:
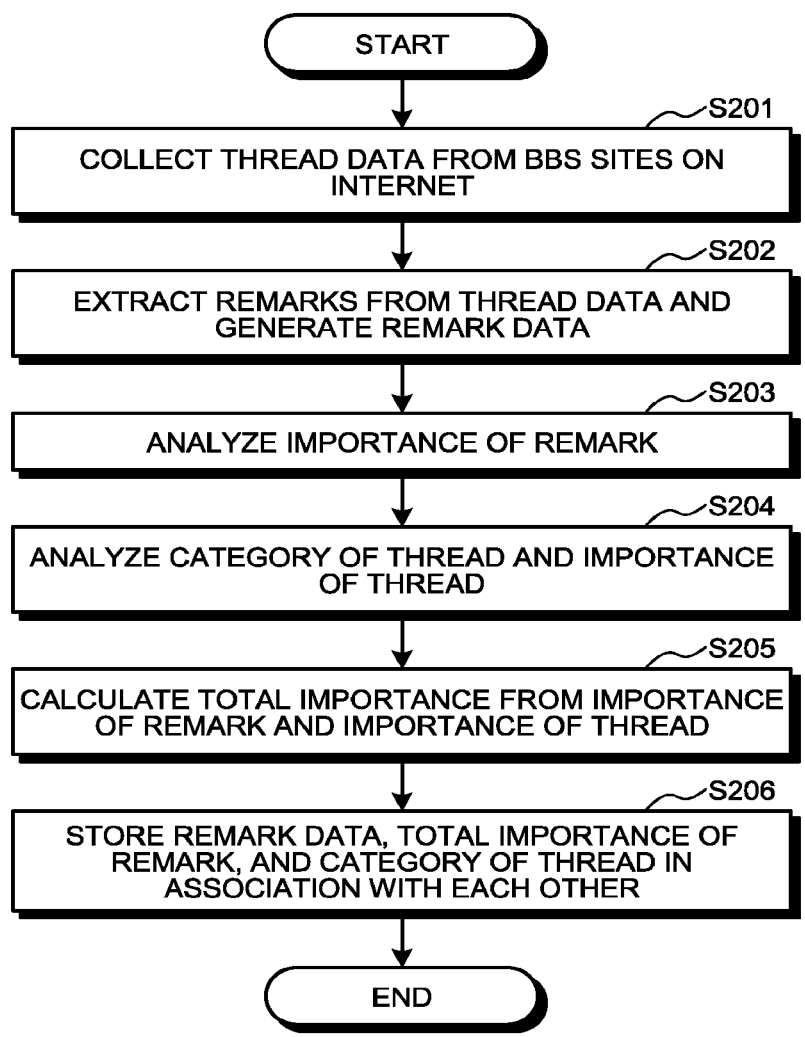
FIG. 5 is a flowchart illustrating a flow of a process in an information analysis system according to a second embodiment.

FIG. 5 is a flowchart illustrating a flow of a process in the information analysis system according to the second embodiment. The processing at Step S201 to Step S203 illustrated in FIG. 5 is the same as the processing at Step S101 to Step S103 in FIG. 3, and explanation thereof is omitted.

As illustrated in FIG. 5, the thread analysis unit 132C of the information analysis system 100 analyzes the category of the thread and the importance of the thread (Step S204). For example, in addition to the processing explained in the first embodiment, the thread analysis unit 132C uses a machine learning engine to calculate the importance of the thread from the thread data, to analyze the importance of the thread. The thread analysis unit 132C transmits the importance of the thread to the storing unit 133 in addition to the category to which the thread belongs, as an analysis result.

The storing unit 133 calculates the total importance of the remark, from the importance of the remark and the importance of the thread (Step S205). For example, the storing unit 133 calculates a value of the sum, the product, or the mean of the importance of the remark and the importance of the thread, or a value obtained by another arithmetic operation, as the total importance. The storing unit 133 stores the remark data, the total importance of the remark, and the category of the thread in association with each other for each of the remarks, in the analysis result storage unit 122 (Step S206).

The processing procedure illustrated in FIG. 5 is not necessarily executed in the order described above. For example, the processing at Step S203 and the processing at Step S204 may be executed in the order reverse to the order described above, or may be executed as parallel processing.

As described above, the information analysis system 100 according to the second embodiment also analyzes the importance of the thread, and unites the importance of the remark with the importance of the thread. This structure enables the information analysis system 100 to calculate the importance of each of the remarks in consideration of the importance of the thread, and analyze more useful remarks.

Figure 6:
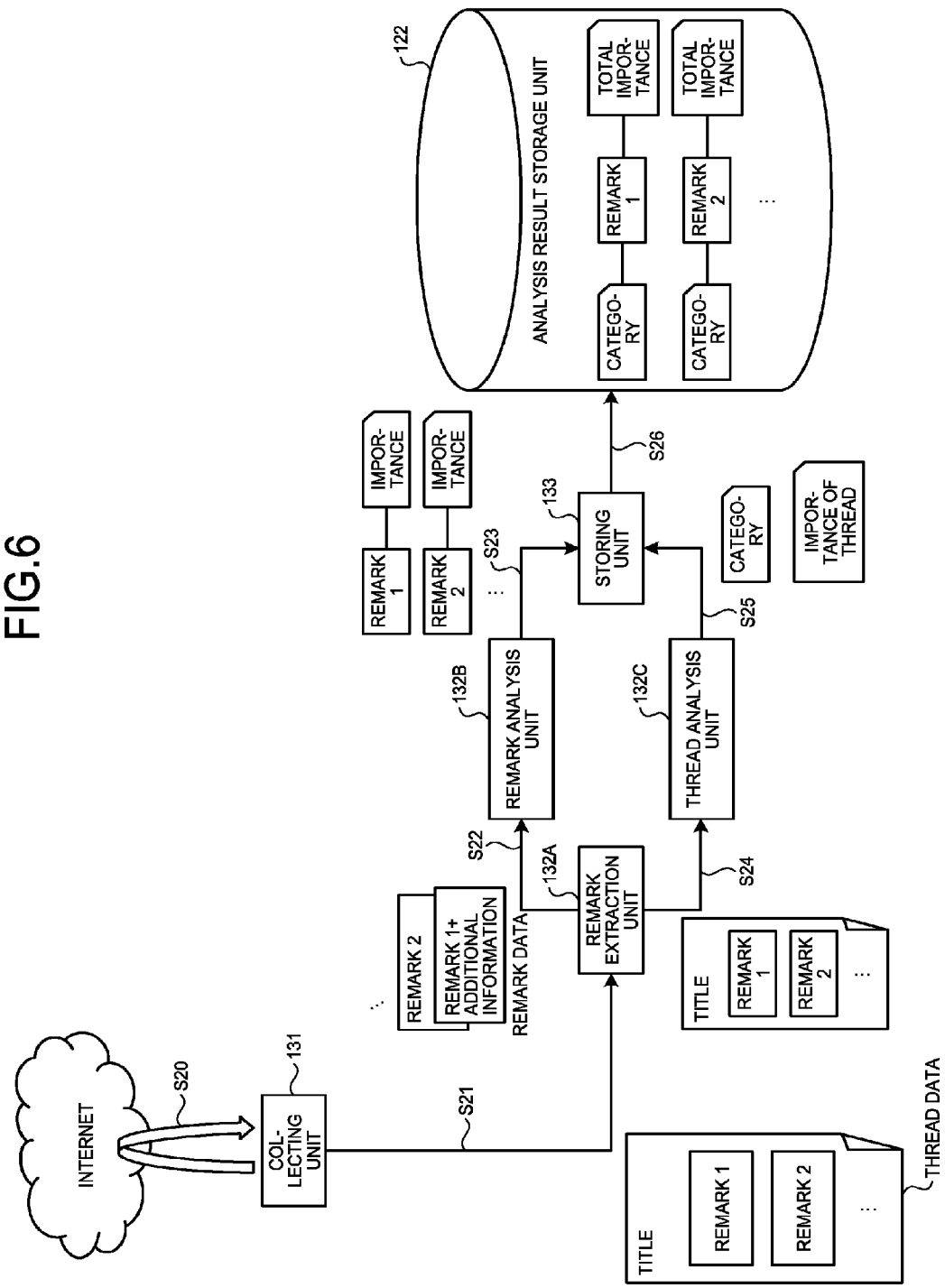
FIG. 6 is a diagram for explaining an effect of the second embodiment.

FIG. 6 is a diagram explaining an effect of the second embodiment. As illustrated in FIG. 6, for example, in the information analysis system 100, the collecting unit 131 collects pieces of thread data from BBS sites on the Internet (S20), and transmits the collected pieces of thread data to the remark extraction unit 132A (S21). Thereafter, the remark extraction unit 132A extracts each of the remarks from the thread data to generate respective pieces of remark data, and transmits the generated remark data to the remark analysis unit 132B (S22). The remark analysis unit 132B analyzes the importance of the remark for each of the remarks, and transmits each pair of the remark data and the importance thereof to the storing unit 133 (S23). Thereafter, the remark extraction unit 132A transmits the thread data to the thread analysis unit 132C (S24). The thread analysis unit 132C analyzes the category of the thread and the importance of the thread, and transmits the analyzed category and the importance of the thread to the storing unit 133 (S25). The storing unit 133 calculates the total importance of the remark from the importance of the remark and the importance of the thread, and stores the remark data, the total importance of the remark, and the category in association with each other for each of the remarks, in the analysis result storage unit 122 (S26). With the structure, the information analysis system 100 according to the second embodiment is enabled to analyze more useful remarks.

Third Embodiment

The first and the second embodiments illustrate the case where the information analysis system 100 analyzes the category of the thread, but the embodiments are not limited thereto. For example, the information analysis system 100 may also analyze remark categories in which remark contents are categorized, to provide the remark categories to the remarks. Examples of the remark categories include categories estimating the remark utterers' feelings, such as "favorable", "hostile", "praiseful", and "blasphemous", and categories estimating the type of remarks, such as "quotation", "proposal", "question", and "answer". Specifically, the remark categories are information indicating which of a plurality of preset categories the remark contents belong to.

For this reason, the third embodiment illustrates the case where the information analysis system 100 analyzes the remark categories, and provides the remark categories to the remarks. In the following explanation, explanation of the configuration and the process that are the same as those in the second embodiment will be omitted.

The following is explanation of a configuration of the information analysis system 100 according to the third embodiment, with reference to FIG. 1. The information analysis system 100 according to the third embodiment has a configuration similar to that of the information analysis system 100 according to the second embodiment, but partly different therefrom in the processing in the remark analysis unit 132B and the storing unit 133.

The remark analysis unit 132B analyzes the remark category for each of the remarks, based on the remark data, in addition to the processing explained in the first embodiment. For example, the remark analysis unit 132B uses a machine learning engine to derive the remark category from the remark data, to analyze the remark category. Thereafter, the remark analysis unit 132B transmits the remark category, in addition to the importance of the remark, to the storing unit 133 as an analysis result. In this case, the machine learning engine is caused to learn in advance some pairs, each of which includes a remark and a remark category thereof. Examples of a method for causing the engine to learn the pairs include a method of selecting some threads from representative BBS sites, manually classifying remarks included in the threads into categories such as "favorable", "hostile", "praiseful", "blasphemous", "quotation", "proposal", "question", and "answer", and causing the machine learning engine to learn them.

Specifically, the remark analysis unit 132B supplies the machine learning engine with the feature vectors converted in the process according to the first embodiment, to calculate the remark category for each of the remarks. The machine learning engine used herein may be of any type, such as Jubatus of an open source. The remark analysis unit 132B transmits the remark category calculated by the machine learning engine to the storing unit 133.

The storing unit 133 stores the remark category of each of the remarks in association with the remark. For example, the storing unit 133 stores the remark data, the total importance, the category of the thread, and the remark category in association with each other for each of the remarks, in the analysis result storage unit 122.

Figure 7:
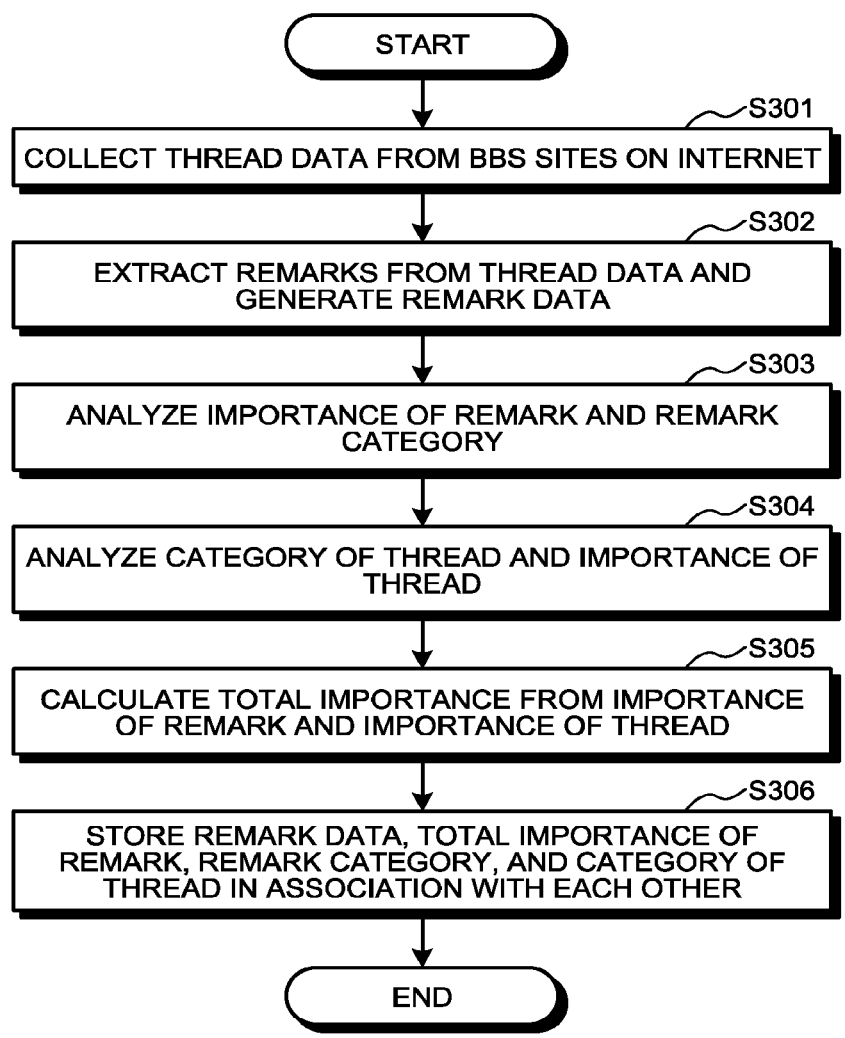
FIG. 7 is a flowchart illustrating a flow of a process in an information analysis system according to a third embodiment.

FIG. 7 is a flowchart illustrating a flow of a process in the information analysis system according to the third embodiment. The processing at Step S301 and Step S302 illustrated in FIG. 7 is the same as the processing at Step S101 to Step S102 in FIG. 3, and explanation thereof is omitted.

As illustrated in FIG. 7, the remark analysis unit 132B of the information analysis system 100 analyzes the importance of the remark and the remark category (Step S303). For example, the remark analysis unit 132B uses a machine learning engine to calculate the remark category from the remark data, to analyze the remark category. The remark analysis unit 132B transmits the remark category to the storing unit 133 in addition to the importance of the remark, as an analysis result.

The thread analysis unit 132C analyzes the category of the thread and the importance of the thread (Step S304). For example, in addition to the processing explained in the first embodiment, the thread analysis unit 132C uses a machine learning engine to calculate the importance of the thread from the thread data, to analyze the importance of the thread. The thread analysis unit 132C transmits the importance of the thread to the storing unit 133 in addition to the category to which the thread belongs, as an analysis result.

The storing unit 133 calculates the total importance of the remark, from the importance of the remark and the importance of the thread (Step S305). For example, the storing unit 133 calculates a value of the sum, the product, or the mean of the importance of the remark and the importance of the thread, or a value obtained by another arithmetic operation, as the total importance. The storing unit 133 stores the remark data, the total importance of the remark, the remark category, and the category of the thread in association with each other for each of the remarks, in the analysis result storage unit 122 (Step S306).

The processing procedure illustrated in FIG. 7 is not necessarily executed in the order described above. For example, the processing at Step S303 and the processing at Step S304 may be executed in the order reverse to the order described above, or may be executed as parallel processing.

As described above, the information analysis system 100 according to the third embodiment analyzes the remark category, and provides the remark category to each of the remarks. This structure enables the information analysis system 100 to perform analysis in consideration of the remark category of each of the remarks, as well as the category of the thread, and analyze more useful remarks.

Figure 8:
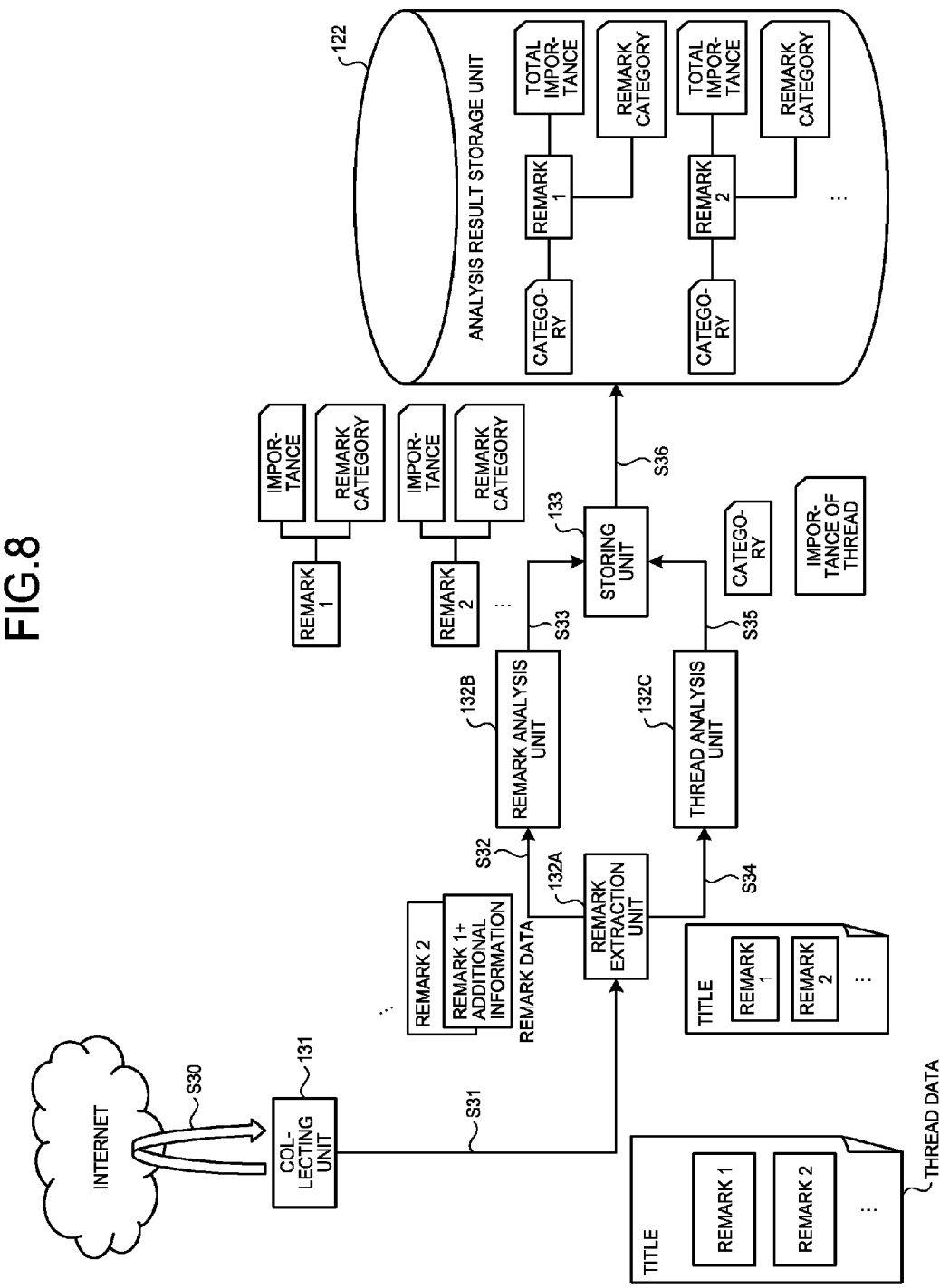
FIG. 8 is a diagram for explaining an effect of the third embodiment.

FIG. 8 is a diagram for explaining an effect of the third embodiment. As illustrated in FIG. 8, for example, in the information analysis system 100, the collecting unit 131 collects pieces of thread data from BBS sites on the Internet (S30), and transmits the collected pieces of thread data to the remark extraction unit 132A (S31). Thereafter, the remark extraction unit 132A extracts each of the remarks from the thread data to generate respective pieces of remark data, and transmits the generated remark data to the remark analysis unit 132B (S32). The remark analysis unit 132B analyzes the importance of the remark and the remark category for each of the remarks, and transmits each set of the remark data, the importance of the remark, and the remark category to the storing unit 133 (S33). Thereafter, the remark extraction unit 132A transmits the thread data to the thread analysis unit 132C (S34). The thread analysis unit 132C analyzes the category of the thread and the importance of the thread, and transmits the analyzed category and the importance of the thread to the storing unit 133 (S35). The storing unit 133 calculates the total importance of the remark from the importance of the remark and the importance of the thread, and stores the remark data, the total importance of the remark, the remark category, and the category of the thread in association with each other for each of the remarks, in the analysis result storage unit 122 (S36). With the structure, the information analysis system 100 according to the third embodiment is enabled to analyze more useful remarks.

The third embodiment illustrates the case where the information analysis system 100 according to the second embodiment further analyzes the remark categories, and provides the remark categories to the respective remarks, but the structure is not limited thereto. For example, the third embodiment may have the structure in which the information analysis system 100 according to the first embodiment analyzes the remark categories, and provides the remark categories to the respective remarks. Specifically, the processing of calculating the importance of the thread may be omitted in the third embodiment.

System Configuration and the Like

Each of the constituent elements of the illustrated devices is functional and conceptual elements, and is not necessarily physically configured as illustrated. Specifically, the specific form of distribution and integration of the each of the devices is not limited to the illustrated form, but the whole or part of the device may be functionally or physically distributed or integrated to be configured in desired unit according to the various types of load, the usage status, or the like. For example, the storing unit 133 may be integrated with the analysis unit 132, or integrated with the remark analysis unit 132B or the thread analysis unit 132C. In addition, whole or desired part of each of the processing functions performed in the respective devices may be achieved by a CPU and a computer program analyzed and executed by the CPU, or achieved as hardware by a wired logic.

Among the processes explained in the present embodiment, whole or part of the process explained as automatically performed process may be manually performed, or whole or part of the process explained as manually performed process may be automatically performed. In addition, the processing procedures, the control procedures, the specific names, and information including various types of data and parameters illustrated in the description above and the drawings may be changed as desired, except for the case that is specially described.

Object to be Processed

The first to the third embodiments described above illustrate the case where thread data of a BBS is analyzed as an object to be processed, but the embodiments are not limited thereto. For example, the information analysis system 100 may perform processing on electronic mails displayed in a thread form (the form in which replies to a predetermined electronic mail are continuously displayed), and a series of remarks serving as replies to a predetermined remark posted in a social networking service (SNS) or the like, as an object to be processed. In the case where electronic mails are adopted as the object, determination of replies and count of the number of replies may be performed in view of the header "In-Reply-To" of the electronic mails, instead of the method of observing the ">(number)" at the head of the remark. The method for determining replies and the method for counting the number of replies may also be set for other objects to be processed, in the same manner.

Computer Program

In addition, a computer program may be prepared by describing the processes executed by the information analysis system 100 explained in the embodiments described above in a language executable by a computer. For example, an information analysis program may be prepared by describing the process executed by the information analysis system 100 according to the first embodiment in a language executable by a computer. In this case, the same effect as that of the embodiment described above can be obtained by executing the information analysis program by a computer.

In addition, the same process as that of the first embodiment may be achieved, by recording the information analysis program on a computer-readable recording medium and reading and executing the information analysis program recorded on the recording medium by a computer. The following is explanation of an example of a computer executing an information analysis program to achieve the same functions as those of the information analysis system 100 illustrated in FIG. 1.

Figure 9:
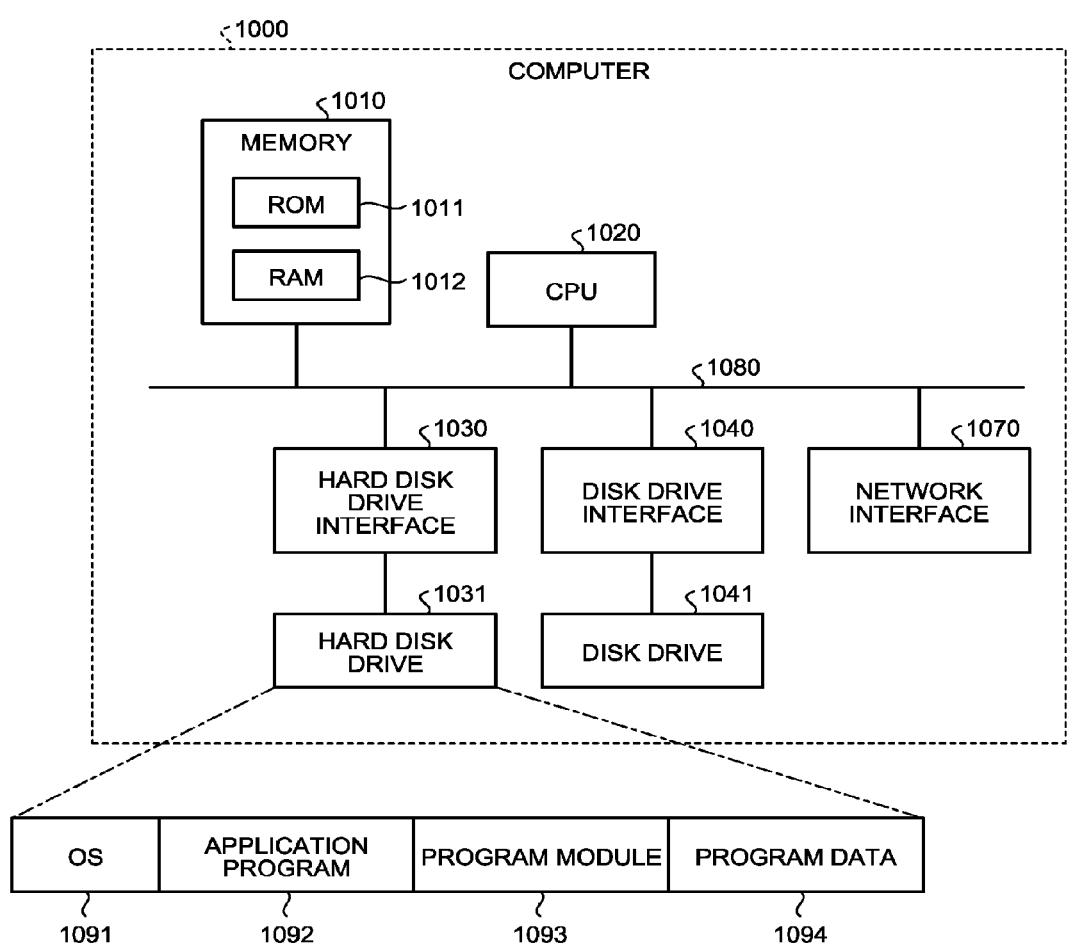
FIG. 9 is a diagram illustrating a computer executing an information analysis program.

FIG. 9 is a diagram illustrating a computer 1000 executing the information analysis program. As illustrated in FIG. 9, the computer 1000 includes, for example, a memory 1010, a CPU 1020, a hard disk drive interface 1030, a disk drive interface 1040, and a network interface 1070, and these units are connected through a bus 1080.

As illustrated in FIG. 9, the memory 1010 includes a read only memory (ROM) 1011 and a random access memory (RAM) 1012. The ROM 1011 stores, for example, a boot program such as a basic input output system (BIOS). The hard disk drive interface 1030 is connected with a hard disk drive 1031, as illustrated in FIG. 9. The disk drive interface 1040 is connected with a disk drive 1041, as illustrated in FIG. 9. A detachable storage medium such as a magnetic disk and an optical disk is inserted into the disk drive.

As illustrated in FIG. 9, the hard disk drive 1031 stores, for example, an OS 1091, an application program 1092, a program module 1093, and program data 1094. Specifically, any of the programs described above is stored in, for example, the hard disk drive 1031, as a program module describing commands to be executed by the computer 1000.

The various types of data explained in the embodiments described above are stored in, for example, the memory 1010 and/or the hard disk drive 1031, as program data. The CPU 1020 reads the program module 1093 and/or the program data 1094 stored in the memory 1010 and/or the hard disk drive 1031 to the RAM 1012, if necessary, to execute the procedures.

The program module 1093 and the program data 1094 relating to the information analysis program are not limited to the case of being stored in the hard disk drive 1031, but may be individually stored in detachable storage media, and read by the CPU 1020 via the disk drive or the like. As another example, the program module 1093 and the program data 1094 relating to the information analysis program may be individually stored in other computers connected through a network (such as a local area network (LAN) and a wide area network (WAN)), and read by the CPU 1020 via the network interface 1070.

These embodiments and modifications thereof are included in the technique disclosed by the present application, and also included in the inventions recited in the claims and an equivalent range thereof.

REFERENCE SIGNS LIST

100 INFORMATION ANALYSIS SYSTEM
110 COMMUNICATION PROCESSOR
120 STORAGE UNIT
121 THREAD DATA STORAGE UNIT
122 ANALYSIS RESULT STORAGE UNIT
130 FUNCTION UNIT
131 COLLECTING UNIT
132 ANALYSIS UNIT
132A REMARK EXTRACTION UNIT
132B REMARK ANALYSIS UNIT
132C THREAD ANALYSIS UNIT
133 STORING UNIT
140 CONTROLLER

The invention claimed is:
1. An information analysis system comprising:
circuitry configured to select a plurality of threads from a bulletin board service or a social networking service,
receive a classification of the plurality of threads as important and unimportant,
train a machine learning engine with the threads classified as important and the threads classified as unimportant,
analyze, using the trained machine learning engine, importance of a remark included in a thread serving as a group of remarks posted on a network, based on remark data serving as data relating to the remark, for each of the remarks,
analyze, using the trained machine learning engine, which of a plurality of preset categories the thread belongs to, based on thread data serving as data relating to the thread,
analyze, using the trained machine learning engine, importance of the thread based on the thread data,
calculate total importance of the remark based on the importance of the remark and the importance of the thread,
store the remark, the total importance of the remark, and a category of the thread including the remark in association with each other for each of the remarks, in a predetermined memory, and
retrieve, from the predetermined memory in response to an input, one or more of useful remarks to be presented to a user.

2. The information analysis system according to claim 1, wherein the circuitry is configured to
analyze a remark category indicating which of a plurality of preset categories contents of the remark belong to, for each of the remarks, based on the remark data, and
store the remark category of each of the remarks in association with the remark.

3. An information analysis method executed by an information analysis system including circuitry, the information analysis method comprising:
selecting, using the circuitry, a plurality of threads from a bulletin board service or a social networking service;
receiving, using the circuitry, a classification of the plurality of threads as important and unimportant;
training, using the circuitry, a machine learning engine with the threads classified as important and the threads classified as unimportant;
analyzing, using the circuitry and the trained machine learning engine, importance of a remark included in a thread serving as a group of remarks posted on a network, based on remark data serving as data relating to the remark, for each of the remarks;
analyzing, using the circuitry and the trained machine learning engine, which of a plurality of preset categories the thread belongs to, based on thread data serving as data relating to the thread;
analyzing, using the circuitry and the trained machine learning engine, importance of the thread based on the thread data;
calculating, using the circuitry, total importance of the remark based on the importance of the remark and the importance of the thread;
storing, using the circuitry, the total importance of the remark, and a category of the thread including the remark in association with each other for each of the remarks, in a predetermined memory; and
retrieving, using the circuitry, from the predetermined memory in response to an input, one or more of useful remarks to be presented to a user.

4. A non-transitory computer-readable recording medium having stored an information analysis program causing a computer to execute a process comprising:
selecting a plurality of threads from a bulletin board service or a social networking service;
receiving a classification of the plurality of threads as important and unimportant;
training a machine learning engine with the threads classified as important and the threads classified as unimportant;
analyzing, using the trained machine learning engine, importance of a remark included in a thread serving as a group of remarks posted on a network, based on remark data serving as data relating to the remark, for each of the remarks;
analyzing, using the trained machine learning engine, which of a plurality of preset categories the thread belongs to, based on thread data serving as data relating to the thread;
analyzing, using the trained machine learning engine, importance of the thread based on the thread data;
calculating total importance of the remark based on the importance of the remark and the importance of the thread;
storing the importance of the remark, and a category of the thread including the remark with each other for each of the remarks, in a predetermined memory; and
retrieving, from the predetermined memory in response to an input, one or more of useful remarks to be presented to a user.

* * * * *